United States Patent
Hsieh et al.

(10) Patent No.: US 8,406,279 B2
(45) Date of Patent: Mar. 26, 2013

(54) SYSTEM AND METHOD FOR PILOT DESIGN FOR DATA TRANSMITTED IN WIRELESS NETWORKS

(75) Inventors: Yu-Tao Hsieh, Hsinchu (TW); Jen-Yuan Hsu, Jincheng Township (TW); Pang-An Ting, Fongyuan (TW); Lai-Huei Wang, Bade (TW)

(73) Assignee: Industrial Technology Research Institute, Hsinchu (TW)

( * ) Notice: Subject to any disclaimer, the term of this patent is extended or adjusted under 35 U.S.C. 154(b) by 1013 days.

(21) Appl. No.: 12/212,054

(22) Filed: Sep. 17, 2008

(65) Prior Publication Data

US 2009/0257516 A1 Oct. 15, 2009

Related U.S. Application Data

(60) Provisional application No. 61/043,688, filed on Apr. 9, 2008.

(51) Int. Cl.
*H04B 1/00* (2006.01)
*H04K 1/10* (2006.01)
*H04W 4/00* (2009.01)

(52) U.S. Cl. .................. 375/149; 375/260; 370/329

(58) Field of Classification Search .................. 375/149, 375/260; 370/329
See application file for complete search history.

(56) References Cited

U.S. PATENT DOCUMENTS

| | | | |
|---|---|---|---|
| 2004/0252629 A1* | 12/2004 | Hasegawa et al. | 370/208 |
| 2006/0146867 A1* | 7/2006 | Lee et al. | 370/465 |
| 2006/0172704 A1* | 8/2006 | Nishio et al. | 455/67.11 |
| 2006/0209732 A1* | 9/2006 | Gorokhov et al. | 370/310 |
| 2006/0251036 A1* | 11/2006 | Gollamudi et al. | 370/342 |
| 2006/0285479 A1* | 12/2006 | Han et al. | 370/203 |
| 2007/0098053 A1* | 5/2007 | Rinne et al. | 375/149 |
| 2007/0104174 A1* | 5/2007 | Nystrom et al. | 370/343 |
| 2007/0153735 A1* | 7/2007 | Frederiksen et al. | 370/329 |
| 2007/0171811 A1* | 7/2007 | Lee et al. | 370/208 |
| 2008/0219361 A1* | 9/2008 | Guey et al. | 375/260 |
| 2009/0074045 A1* | 3/2009 | Mudulodu et al. | 375/226 |

* cited by examiner

*Primary Examiner* — Michael P. Handel
*Assistant Examiner* — Sarah Hassan
(74) *Attorney, Agent, or Firm* — Finnegan, Henderson, Farabow, Garrett & Dunner, LLP

(57) ABSTRACT

A method for pilot design for data to be transmitted by an orthogonal frequency-division multiplexing (OFDM) based communication system, the data being represented by a plurality of OFDM symbols. The method includes allocating pilot symbols for a data stream to be included in ones of the OFDM symbols; and performing a frequency shift on at least one of the OFDM symbols, to reduce frequency distance disparities among the pilot symbols.

12 Claims, 18 Drawing Sheets

Fig. 8B

SYSTEM AND METHOD FOR PILOT DESIGN FOR DATA TRANSMITTED IN WIRELESS NETWORKS

RELATED APPLICATIONS

This application is based upon and claims the benefit of priority from U.S. Provisional Patent Application No. 61/043,688, filed Apr. 9, 2008, the entire contents of which are incorporated herein by reference.

FIELD OF THE INVENTION

This invention relates to systems and methods for pilot design for data transmitted in wireless networks.

BACKGROUND OF THE INVENTION

Wireless communication techniques based on multiple subcarriers, such as an orthogonal frequency-division multiplexing (OFDM) technique, are gaining worldwide popularity due to their broad applications. For example, an OFDM based communication system may be used in a plurality of networks including Worldwide Interoperability for Microwave Access (WiMax) networks, Wireless Fidelity (Wi-Fi) networks, Wireless Broadband (WiBro) networks, etc.

The OFDM technique uses a plurality of closely-spaced orthogonal subcarriers to carry data. For example, the data may be allocated on a plurality of parallel data channels, one for each of the subcarriers. Each of the subcarriers may be modulated with a conventional modulation scheme, e.g., quadrature amplitude modulation, at a relatively low symbol rate. In addition, based on the OFDM technique, an inverse fast Fourier transform (IFFT) may be performed on OFDM symbols representing the data on a transmitter side, and a fast Fourier transform (FFT) may be performed to recover the OFDM symbols on a receiver side. Signals including the OFDM symbols are transmitted from the transmitter side to the receiver side through a communication channel.

In reality, the communication channel may have an effect on the signals when the signals are transmitted. The receiver side may need knowledge of the communication channel to remove such effect, in order to accurately recover the data. To facilitate estimation of the communication channel, signals known to both the transmitter side and the receiver side, i.e., pilot symbols, may be inserted in OFDM symbols on the transmitter side. The receiver side may perform channel estimation based on resource blocks in received signals, and each of the resource blocks includes a plurality of OFDM symbols and, hence, pilot symbols.

FIG. 1 illustrates a structure of a conventional resource block 100 in a time-frequency domain. For example, the resource block 100 includes data to be transmitted by an OFDM based communication system having first, second, third, and fourth antennas transmitting first, second, third, and fourth data streams, respectively. The data to be transmitted are carried by a plurality of subcarriers, one corresponding to each row in FIG. 1.

The resource block 100 includes a plurality of data symbols each represented by a small block with a letter "D" and a plurality of pilot symbols each represented by a small block with an indexed letter P. For example, the small blocks with indexed letters "P1," "P2," "P3," and "P4" represent the pilot symbols for the first, second, third, and fourth data streams, respectively. The data and/or pilot symbols at a same time, i.e., in a same column in FIG. 1, correspond to an OFDM symbol. In FIG. 1, the resource block 100 includes six OFDM symbols S1, . . . , S6.

The receiver side may perform channel estimation based on the pilot symbols in the resource block 100. For example, based on the pilot symbols labeled as "P1", which correspond to ones of the plurality of subcarriers, the receiver side may use interpolation techniques to estimate a channel response at frequencies of all of the plurality of subcarriers for the first data stream.

However, the pilot symbols for the first data stream, i.e., the pilot symbols labeled as "P1," are not uniformly distributed in frequency, as indicated in FIG. 1 by the number "2" or "3" for a frequency spacing between the pilot symbols for the first data stream. As a result, accuracy of channel estimation may be degraded for the first data stream. Similarly, accuracy of channel estimation may also be degraded for the second data stream.

SUMMARY OF THE INVENTION

In accordance with the invention, there is provided a method for pilot design for data to be transmitted by an orthogonal frequency-division multiplexing (OFDM) based communication system, the data being represented by a plurality of OFDM symbols, the method comprising: allocating pilot symbols for a data stream to be included in ones of the OFDM symbols; and performing a frequency shift on at least one of the OFDM symbols, to reduce frequency distance disparities among the pilot symbols.

Also in accordance with the invention, there is provided a transmitter to transmit data using a plurality of orthogonal frequency-division multiplexing (OFDM) symbols, the OFDM symbols including allocated pilot symbols for a data stream, the transmitter comprising: an inverse fast Fourier transform (IFFT) component configured to receive the OFDM symbols and to generate time-domain parallel signals; a parallel-to-serial conversion component configured to perform parallel-to-serial conversion of the parallel signals to generate serial signals; a cyclic prefix insert component configured to add cyclic prefixes in the serial signals to reduce signal interference on a receiver side; and a frequency shift component configured to perform a frequency shift on at least one of the OFDM symbols, to reduce frequency distance disparities among the pilot symbols for the data stream.

Further in accordance with the invention, there is provided a receiver to receive signals including a plurality of orthogonal frequency-division multiplexing (OFDM) symbols, the OFDM symbols including allocated pilot symbols for a data stream, the receiver comprising: a frequency shift component configured to perform a frequency shift on at least one of the OFDM symbols; a cyclic prefix removal component configured to remove cyclic prefixes from the received signals to generate serial signals; a serial-to-parallel conversion component configured to perform serial-to-parallel conversion of the serial signals to generate parallel signals; and a fast Fourier transform (FFT) component configured to receive the parallel signals and to recover the OFDM symbols.

Further in accordance with the invention, there is provided a method for pilot design for data to be transmitted by an orthogonal frequency-division multiplexing (OFDM) based communication system, the data being represented by a plurality of OFDM symbols, the method comprising: allocating, when the communication system is moving at a relatively high speed, a plurality of groups of pilot symbols for at least one data stream based on a pilot symbol allocation for use when the communication system is moving at a relatively low speed, such that the communication system transmits a reduced number of data streams when moving at the relatively high speed.

Further in accordance with the invention, there is provided an apparatus for pilot design for data to be transmitted by an orthogonal frequency-division multiplexing (OFDM) based communication system, the data being represented by a plurality of OFDM symbols, the apparatus being configured to: allocate, when the communication system is moving at a relatively high speed, a plurality of groups of pilot symbols for at least one data stream based on a pilot symbol allocation for use when the communication system is moving at a relatively low speed, such that the communication system transmits a reduced number of data streams when moving at the relatively high speed.

Further in accordance with the invention, there is provided a method for pilot design for data to be transmitted by an orthogonal frequency-division multiplexing (OFDM) based communication system, the method comprising: generating, based on an original pilot pattern, a low-mobility pilot pattern represented by a first plurality of OFDM symbols in a first resource block, for use when the communication system is at a relatively low speed; and generating, based on the low-mobility pilot pattern, a high-mobility pilot pattern represented by a second plurality of OFDM symbols in a second resource block, for use when the communication system is at a relatively high speed; wherein generating the low-mobility pilot pattern includes allocating at least a first pilot symbol for a first data stream and a second pilot symbol for a second data stream to adjacent subcarriers of the communication system, the first and second pilot symbols being in a same one of the first plurality of OFDM symbols.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

FIGS. 8A and 8B each show a pilot design example in a resource block, according to an exemplary embodiment

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 2A:
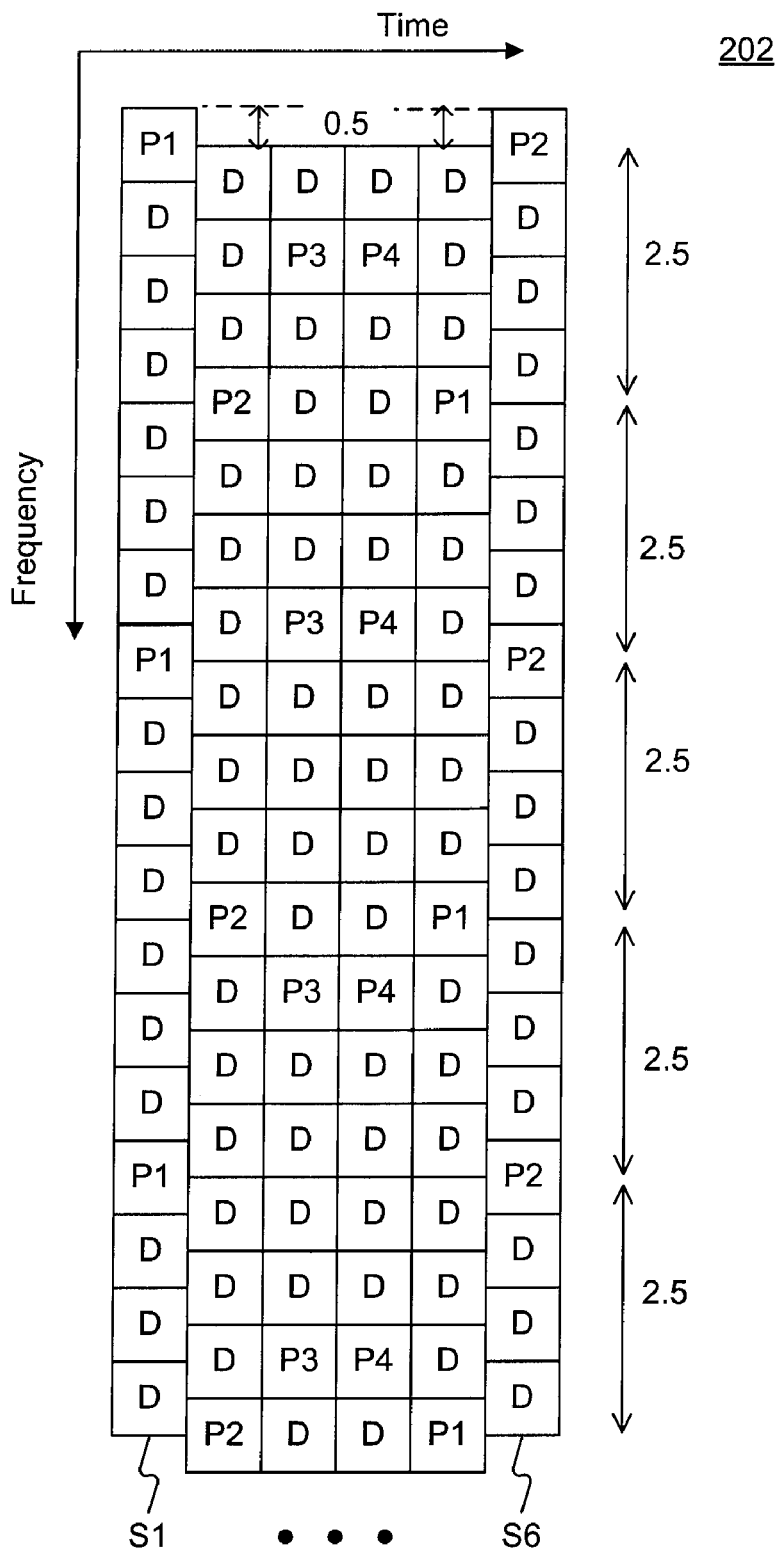
FIGS. 2A and 2B illustrate a frequency shift method for pilot design for data to be transmitted in a wireless communication system, according to an exemplary embodiment.
Figure 2B:
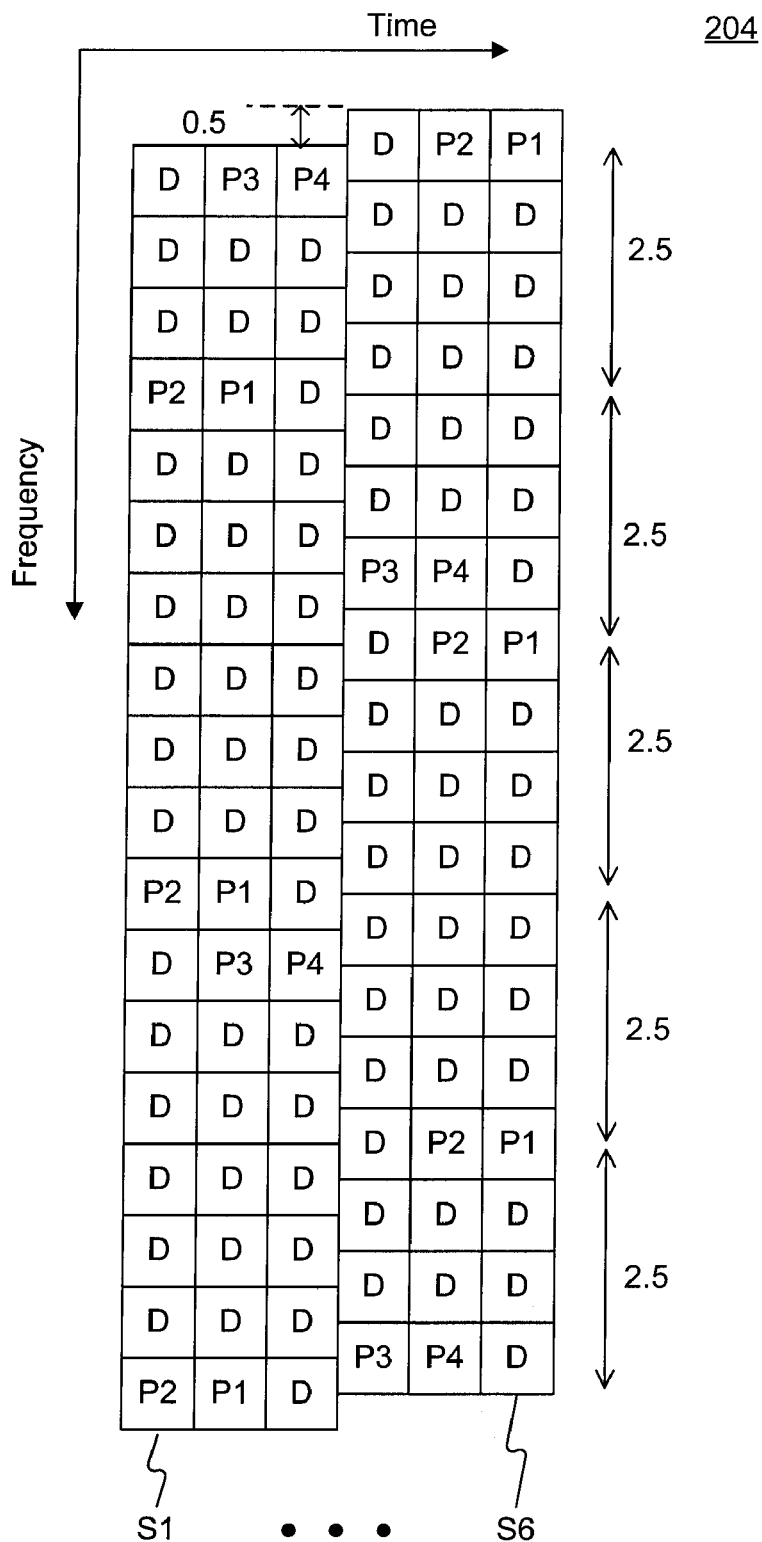

FIGS. 2A and 2B illustrate a frequency shift method for pilot design for data to be transmitted in a wireless communication system, according to an exemplary embodiment. For illustrative purposes only, it is assumed that the communication system is an orthogonal frequency-division multiplexing (OFDM) based communication system having first, second, third, and fourth antennas transmitting first, second, third, and fourth data streams, respectively. It is also assumed that the data to be transmitted are carried by a plurality of subcarriers, with an equal subcarrier spacing, one subcarrier corresponding to each row. A subcarrier spacing is a frequency difference between two adjacent subcarriers, which carry two adjacent data/pilot symbols in an OFDM symbol.

The data to be transmitted may be represented by an exemplary resource block 202 in a time-frequency domain shown in FIG. 2A or an exemplary resource block 204 in a time-frequency domain shown in FIG. 2B. The resource block 202 or 204 includes a plurality of data symbols each represented by a small block with a letter "D" and a plurality of pilot symbols each represented by a small block with an indexed letter P. For example, the small blocks with indexed letters "P1," "P2," "P3," and "P4" represent the pilot symbols for the first, second, third, and fourth data streams, respectively. The data and pilot symbols at a same time, i.e., in a same column in FIG. 2A or 2B, correspond to an OFDM symbol. In the illustrated embodiment, the resource block 202 or 204 includes six OFDM symbols S1, ..., S6.

In exemplary embodiments consistent with the present invention, a frequency shift may be performed on at least one of the OFDM symbols S1, ..., S6 in the resource block 202 or 204, to reduce distance disparities between distances among pilot symbols for a data stream. For example, a distance between first and second pilot symbols is a difference between a first frequency corresponding to the first pilot symbol and a second frequency corresponding to the second pilot symbol. One of the possible results from the performed frequency shift is that the pilot symbols for each of the first, second, third, and fourth data streams may have a relatively uniform distribution in frequency. A value of the frequency shift may be fixed within each of the OFDM symbols S1, ..., S6, but may vary among different ones of the OFDM symbols S1, ..., S6. The value of the frequency shift may be an integer or non-integer multiple of the subcarrier spacing.

In one exemplary embodiment, shown in FIG. 2A, the pilot symbols for the first, second, third, and fourth data streams are allocated in the resource block 202, and the frequency shift is then performed on each of the OFDM symbols S1 and S6. For example, the value of the frequency shift is one-half of the subcarrier spacing for each of the OFDM symbols S1 and S6, indicated by the number "0.5" in FIG. 2A. As a result, the pilot symbols for the first data stream, represented by the small blocks with "P1," have reduced distance disparities. For example, the pilot symbols for the first data stream have a relatively uniform distribution in frequency with a spacing equal to two and one-half times the subcarrier spacing. The pilot symbols for the second data stream, represented by the small blocks with "P2," also have reduced distance disparities. For example, the pilot symbols for the second data stream have a relatively uniform distribution in frequency with a spacing equal to two and one-half times the subcarrier spacing, both indicated by the number "2.5" in FIG. 2A. In addition, the pilot symbols for the third data stream, represented by the small blocks with "P3," or the pilot symbols for the fourth data stream, represented by the small blocks with "P4," also have a relatively uniform distribution in frequency with a spacing equal to four times the subcarrier spacing.

In one exemplary embodiment, shown in FIG. 2B, the pilot symbols for the first, second, third, and fourth data streams are allocated in the resource block 204, and the frequency shift is then performed on each of the OFDM symbols S4, S5, and S6. For example, the value of the frequency shift is one-half the subcarrier spacing for each of the OFDM symbols S4, S5, and S6, indicated by the number "0.5" in FIG. 2B. As a result, as indicated in FIG. 2B, among the pilot symbols for the first data stream, represented by the small blocks with "P1," there are reduced distance disparities. For example, the pilot symbols for the first data stream have a relatively uniform distribution in frequency with a spacing equal to two and one-half times the subcarrier spacing. Similarly, among the pilot symbols for the second data stream, represented by the small blocks with "P2," there are reduced distance disparities. For example, the pilot symbols for the second data stream have a relatively uniform distribution in frequency with a spacing equal to two and one-half times the subcarrier spacing, both indicated by the number "2.5" in FIG. 2B. In addition, the pilot symbols for the third data stream, represented by the small blocks with "P3," or the pilot symbols for the fourth data stream, represented by the small blocks with "P4," also have a relatively uniform distribution in frequency with a spacing equal to four and one-half times the subcarrier spacing.

Figure 3:
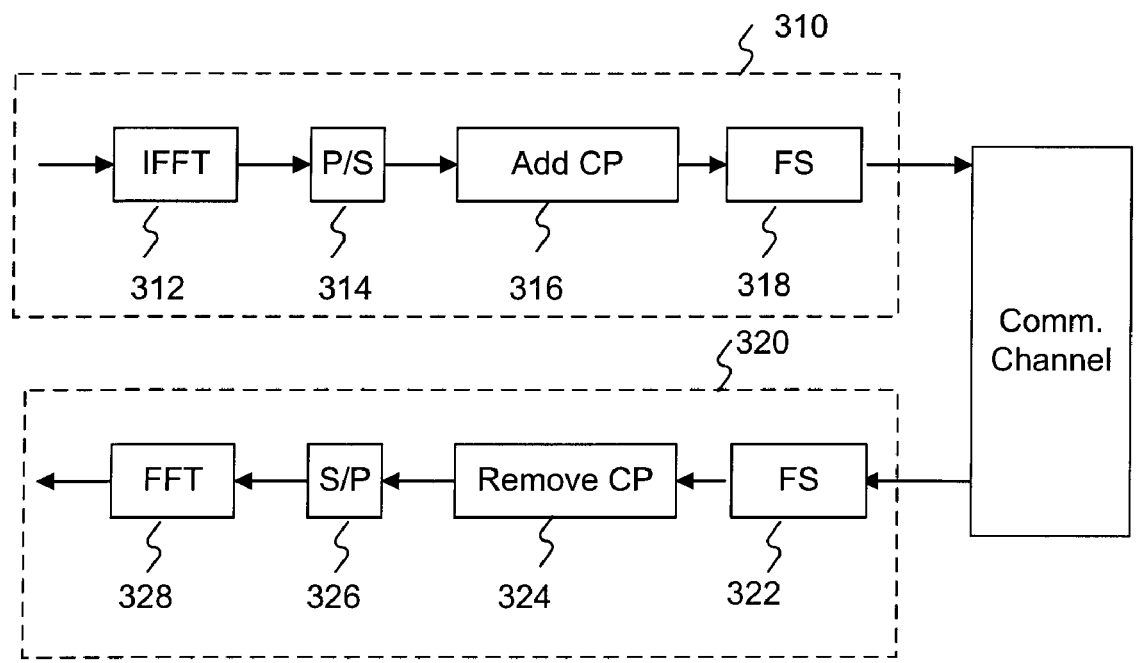
FIG. 3 illustrates a block diagram of an OFDM based communication system using a frequency shift method, according to an exemplary embodiment.

FIG. 3 illustrates a block diagram of an OFDM based communication system 300 using the above described frequency shift method, according to an exemplary embodiment. The system 300 includes a transmitter 310, which further includes an inverse fast Fourier transform (IFFT) component 312, a parallel to serial (P/S) conversion component 314, a cyclic prefix (CP) insert component 316, and a frequency shift (FS) component 318. The system 300 also includes a receiver 320, which further includes a frequency shift component 322, a cyclic prefix removal component 324, a serial to parallel (S/P) conversion component 326, and a fast Fourier transform (FFT) component 328.

In embodiments consistent with the present invention, data to be transmitted are represented by OFDM symbols, and are inputted to the IFFT component 312 to generate time-domain parallel signals. The P/S conversion component 314 performs P/S conversion of the parallel signals to generate serial signals, and the cyclic prefix insert component 316 adds cyclic prefixes in the serial signals to reduce signal interference on a receiver side. The frequency shift component 318 further performs a frequency shift on at least one of the OFDM symbols, such as the OFDM symbols S1 and S6 in FIG. 2A or the OFDM symbols S4, S5, and S6 in FIG. 2B, included in the serial signals. The serial signals are then transmitted through a communication channel to the receiver 320.

At the receiver 320, received signals are inputted to the frequency shift component 322 to remove the frequency shift performed by the frequency shift component 318. Cyclic prefixes in the received signals are further removed by the cyclic prefix removal component 324, to generate recovered serial signals. The S/P conversion component 326 performs S/P conversion of the recovered serial signals to generate recovered parallel signals, which are then inputted to the FFT component 328 for retrieving the data.

Due to the frequency shift performed by the frequency shift component 318, pilot symbols in a resource block may have reduced distance disparities such as having a relatively uniform distribution in frequency, and the resource block is used to estimate a channel response. Accordingly, the channel response may be first obtained at frequencies of pilot subcarriers which have a relatively uniform spacing. Interpolation techniques may then be used to calculate the channel response at frequencies of data subcarriers. As a result, channel estimation accuracy may be improved.

In exemplary embodiments consistent with the present invention, pilot allocation may be determined by a speed of a communication system. When the communication system is in high mobility, i.e., the speed of the communication system is larger than a threshold value such as 350 kilometers per hour, the communication system may transmit data using a reduced or specific number of transmitting antennas, compared to when the communication system is in low mobility, i.e., the speed of the communication system is not larger than the threshold value. The communication system may perform pilot allocation for data to be transmitted when the communication system is in high mobility, referred to herein as high-mobility pilot allocation, based on pilot allocation for data transmitted when the communication system is in low mobility, referred to herein as low-mobility pilot allocation.

In exemplary embodiments consistent with the present invention, pilot allocation may be based on an original pilot pattern such as a known pilot pattern. If the original pilot pattern includes clustered or grouped pilot allocation, i.e., pilot symbols for different data streams are allocated to adjacent subcarriers of the communication system in an OFDM symbol, the original pilot pattern may be used as a low-mobility pilot pattern for pilot allocation when the communication is in low mobility. If the original pilot pattern does not include clustered or grouped pilot allocation, a low-mobility pilot pattern may be generated based on the original pilot pattern. The generated low-mobility pilot pattern includes clustered or grouped pilot allocation. In each situation, the low-mobility pilot pattern may then be used to generate a high-mobility pilot pattern for pilot allocation when the communication is in high mobility.

In exemplary embodiments consistent with the present invention, high-mobility pilot allocation may be initiated by the communication system in high mobility. High-mobility pilot allocation may also be requested or mandated by another communication system that performs communication with the communication system in high mobility.

Figure 4A:
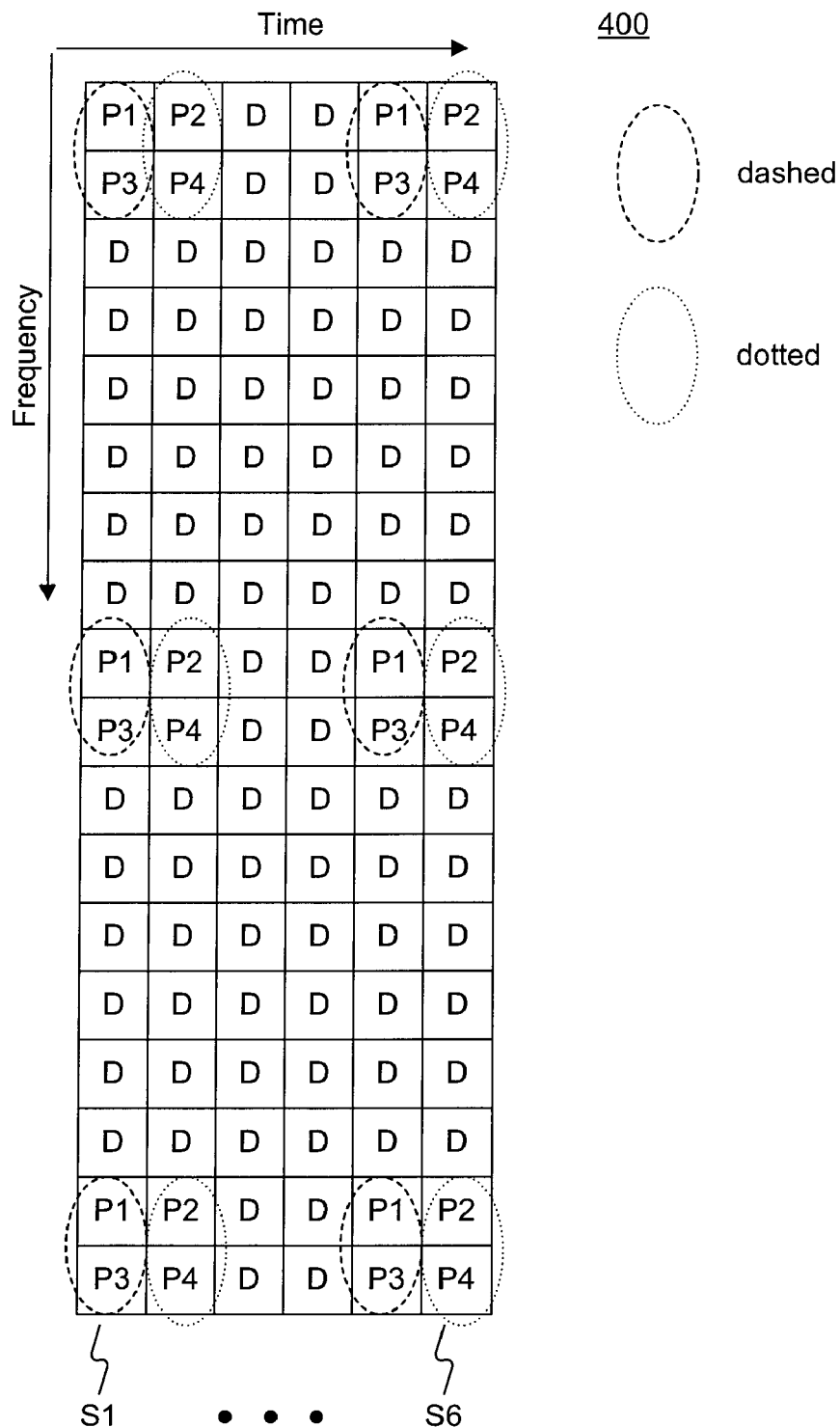
FIGS. 4A and 4B illustrate a method for pilot design for data to be transmitted by a wireless communication system that may be in high mobility, according to an exemplary embodiment.
Figure 4B:
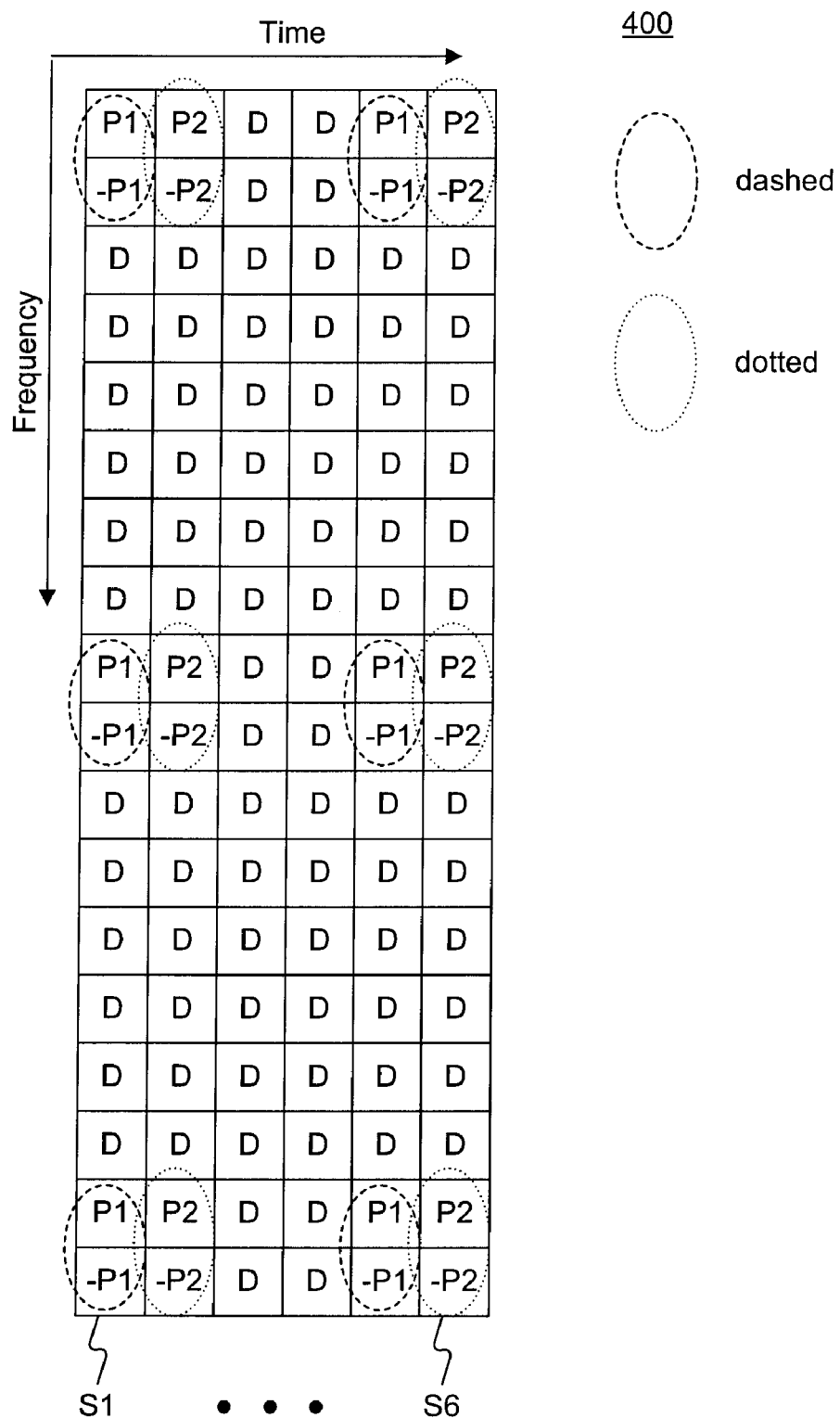

FIGS. 4A and 4B illustrate a method for pilot design for data to be transmitted by a communication system that may be in high mobility, according to an exemplary embodiment. For illustrative purposes only, it is assumed the communication system is an OFDM based communication system having first, second, third, and fourth antennas transmitting first, second, third, and fourth data streams, respectively.

FIG. 4A shows an original pilot pattern in a resource block 400 in a time-frequency domain. Each row of FIG. 4A corresponds to a subcarrier of the communication system, and each column of FIG. 4A corresponds to an OFDM symbol. For example, the original pilot pattern in the resource block 400 may be a known pilot pattern.

Referring to FIG. 4A, the resource block 400 includes a plurality of OFDM symbols such as OFDM symbols S1, ..., S6, which further include a plurality of data symbols each represented by a small block with a letter "D" and a plurality of pilot symbols each represented by a small block with an indexed letter P. For example, the small blocks with indexed letters "P1," "P2," "P3," and "P4" represent pilot symbols for first, second, third, and fourth data streams, respectively.

In addition, the pilot symbols for the first data stream and the pilot symbols for the third data stream are assigned to adjacent subcarriers of the communication system, as indicated by the dashed circles in FIG. 4A. The pilot symbols for the second data stream and the pilot symbols for the fourth data stream are also assigned to adjacent subcarriers of the communication system, as indicated by the dotted circles.

When the communication system is in low mobility, the communication system may transmit data using the first, second, third, and fourth antennas. The communication system may allocate pilot symbols for the first, second, third, and fourth data streams, based on the original pilot pattern in the resource block 400 shown in FIG. 4A. In other words, the original pilot pattern in the resource block 400 shown in FIG. 4A is the low-mobility pilot pattern.

When the communication system is in high mobility, the communication system may transmit a reduced or particular number of data streams such as the first and second data streams. For example, the communication system only uses the first and second antennas and disables the third and fourth antennas. A high-mobility pilot pattern may be generated based on the low-mobility pattern. The communication system may, when in high-mobility, allocate pilot symbols for the first and second data streams, according to the high-mobility pilot pattern.

As shown in FIG. 4A, the pilot symbols for the first and third data streams are assigned to adjacent subcarriers in the OFDM symbols S1 and S5, and therefore may be grouped to form a first plurality of groups of pilot symbols, each represented by one of the dashed circles. The pilot symbols for the second and fourth data streams are assigned to adjacent subcarriers in the OFDM symbols S2 and S6, and therefore may be grouped to form a second plurality of groups of pilot symbols, each represented by one of the dotted circles.

Referring to FIG. 4B, each of the first and second plurality of groups of pilot symbols is further updated to have antipolarity, to generate the high-mobility pattern. For example, each of the first plurality of groups includes first and second pilot symbols adjacent in the OFDM symbol S1 or S5. If the first pilot symbol is P1, the second pilot symbol is −P1. Similarly, each of the second plurality of groups of pilot symbols is further updated to have pilot symbols with antipolarity. For example, each of the second plurality of groups includes first and second pilot symbols adjacent in the OFDM symbol S2 or S6. If the first pilot symbol is P2, the second pilot symbol is −P2. The first and second plurality of pilot symbols may then be used for the first and second data streams, respectively, when the communication system is in high mobility. Modulation of pilot symbols having anti-polarity may reduce inter-carrier interference (ICI). Accordingly, accuracy of channel estimation based on interpolation techniques may be improved.

Figure 5A:
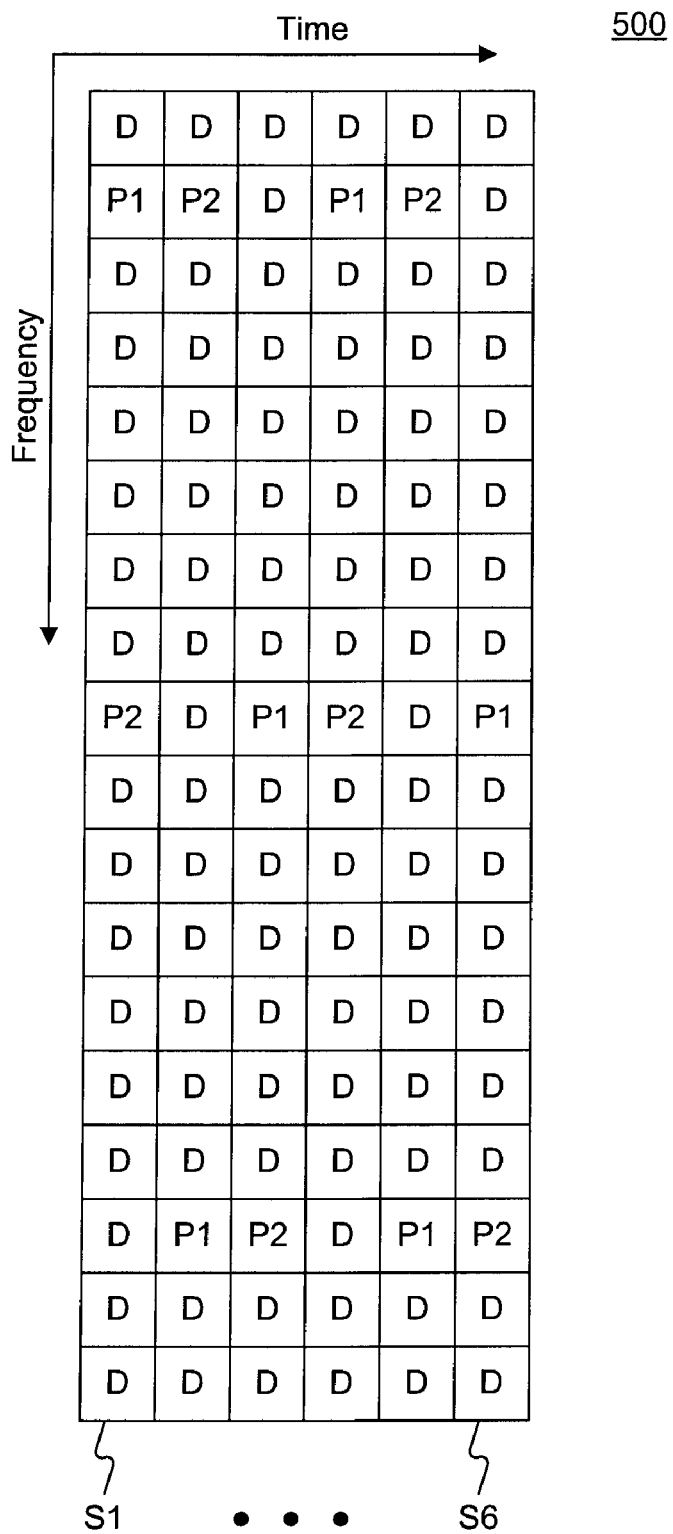
FIGS. 5A-5C illustrate a method for pilot design for data to be transmitted by a wireless communication system that may be in high mobility, according to an exemplary embodiment.
Figure 5B:
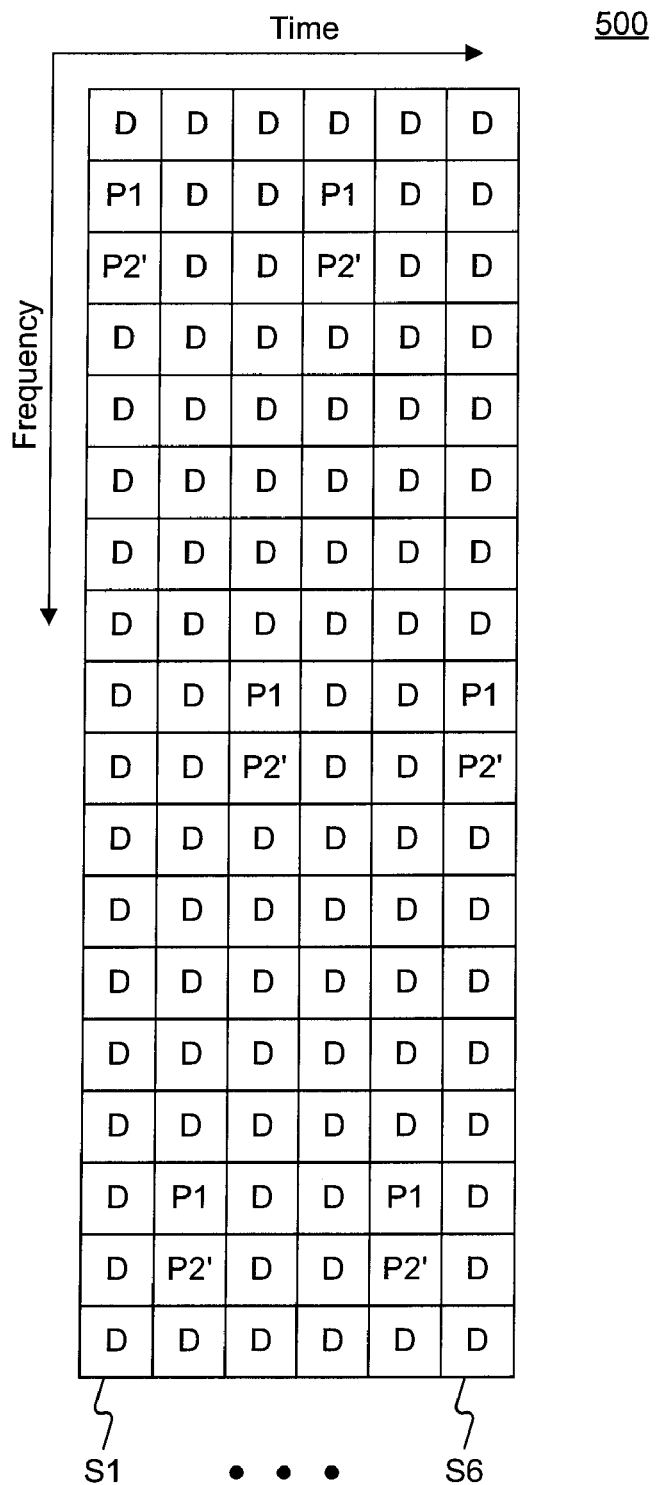
Figure 5C:
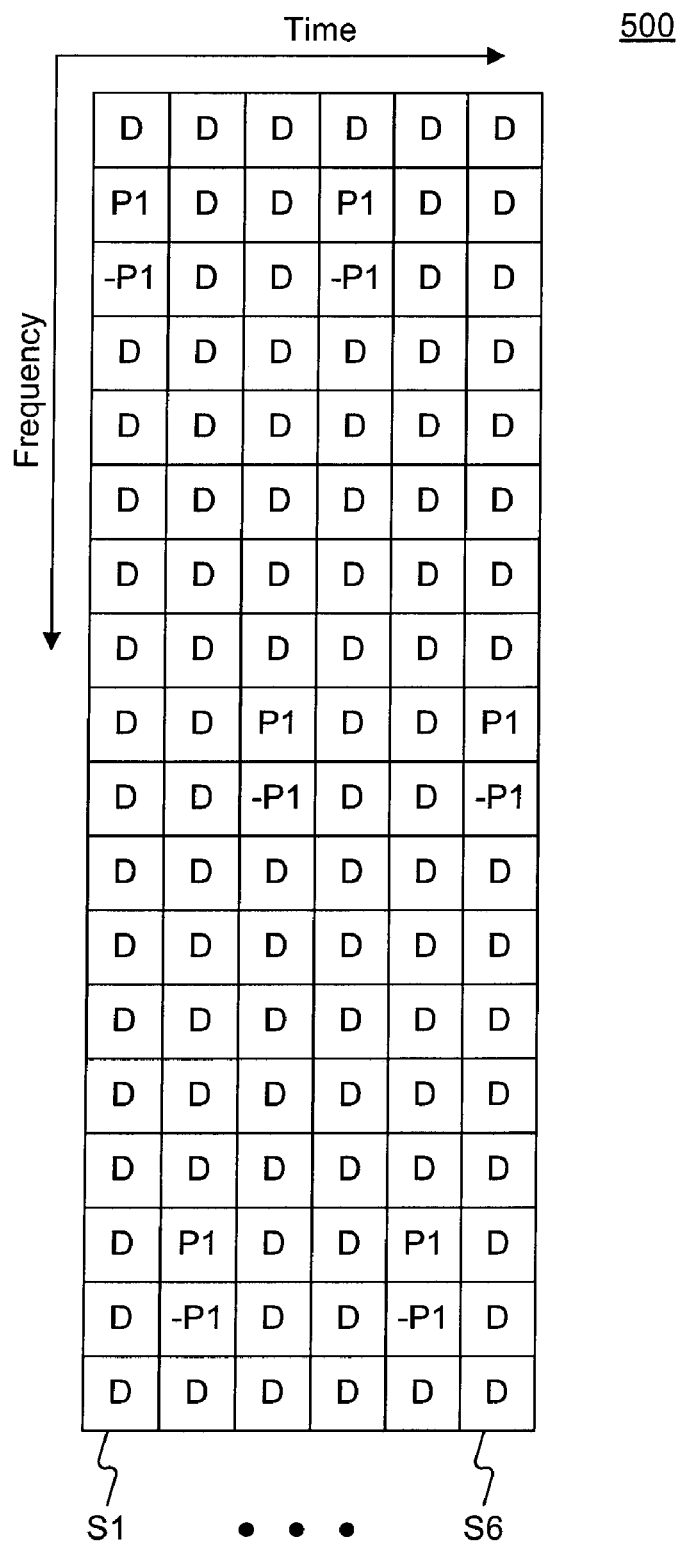

FIGS. 5A-5C illustrate a method for pilot design for data to be transmitted by a wireless communication system that may be in high mobility, according to an exemplary embodiment. For illustrative purposes only, it is assumed the communication system is an OFDM based communication system having first and second antennas transmitting first and second data streams, respectively.

FIG. 5A shows an original pilot pattern in a resource block 500 in a time-frequency domain. Each row of FIG. 5A corresponds to a subcarrier of the communication system, and each column of FIG. 5A corresponds to an OFDM symbol. For example, the original pilot pattern in the resource block 500 may be a known pilot pattern. However, different from the resource block 400 (FIG. 4A), the pilot symbols for different data streams are not assigned to adjacent subcarriers in an OFDM symbol in the resource block 500 (FIG. 5A).

Referring to FIG. 5A, the resource block 500 includes a plurality of OFDM symbols such as OFDM symbols S1, ..., S6, which further include a plurality of data symbols each represented by a small block with a letter "D" and a plurality of pilot symbols each represented by a small block with an indexed letter P. For example, the small blocks with indexed letters "P1" and "P2" represent pilot symbols for first and second data streams, respectively.

When the communication system is in low mobility, the communication system may transmit the first and second data streams using the first and second antennas, respectively. A low-mobility pilot pattern may be generated based on the original pilot pattern in the resource block 500 (FIG. 5A). The generated low-mobility pilot pattern includes clustered or grouped pilot allocation.

In one exemplary embodiment, the pilot symbols for one of the first and second data streams in the original pilot pattern in the resource block 500 (FIG. 5A) may be selected. For example, the pilot symbols for the first data stream are selected. Referring to FIG. 5B, for each of the selected pilot symbols, a subcarrier adjacent to the subcarrier carrying the one of the selected pilot symbols is used to carry a new pilot symbol for the second data stream, represented by each of the small blocks labeled as "P2'." The one of the selected pilot symbols for the first data stream and the new pilot symbol for the second data stream are in a same one of the OFDM symbols S1, ... S6. As a result, the pilot symbols for the first data stream, represented by the small blocks labeled as "P1," and the pilot symbols for the second data stream, represented by the small blocks labeled as "P2'," form a plurality of groups of pilot symbols. In addition, data symbols replace the pilot symbols for the second data stream in the original pilot pattern in the resource block 500 (FIG. 5A). Thus, as shown in FIG. 5B, the low-mobility pilot pattern is generated for use when the communication system is in low-mobility.

When the communication system is in high mobility, the communication system may transmit a reduced or particular number of data streams. For example, the communication system may select only the first transmitting antenna to transmit the first data stream and disable the second antenna. In addition, a high-mobility pilot pattern is generated based on the low-mobility pilot pattern shown in FIG. 5B. The communication system may, when in high-mobility, allocate pilot symbols for the first data stream, according to the high-mobility pilot pattern.

In one exemplary embodiment, each of the plurality of groups of pilot symbols in the resource block 500 (FIG. 5B) is further updated to have anti-polarity. For example, each of the plurality of groups includes first and second pilot symbols assigned to adjacent subcarriers in the OFDM symbols S1, ..., S6. If the first pilot symbol is P1, the second pilot symbol is designated as −P1. Thus, as shown in FIG. 5C, the high-mobility pilot pattern is generated for use when the communication system is in high-mobility. Modulation of pilot symbols having anti-polarity may reduce inter-carrier interference (ICI). Accordingly, accuracy of channel estimation based on interpolation techniques may be improved.

In exemplary embodiments consistent with the present invention, the frequency shift method described above may be further applied to the low-mobility pilot pattern or the high-mobility pilot pattern, if the pilot symbols for a data stream have relatively large distance disparities. As a result, the pilot symbols for that data stream may then have reduced distance disparities.

Figure 6A:
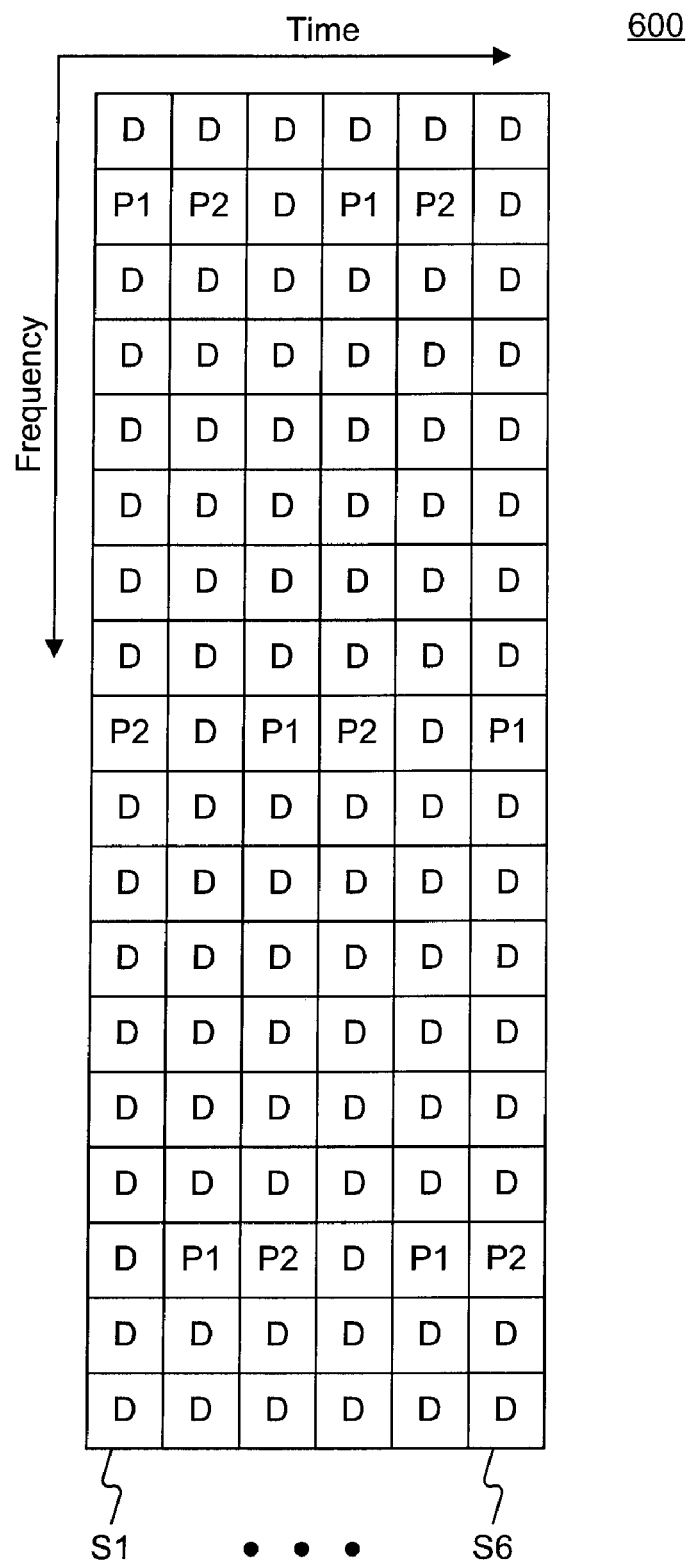
FIGS. 6A-6C illustrate a method for pilot design for data to be transmitted by a wireless communication system that may be in high mobility, according to an exemplary embodiment.
Figure 6B:
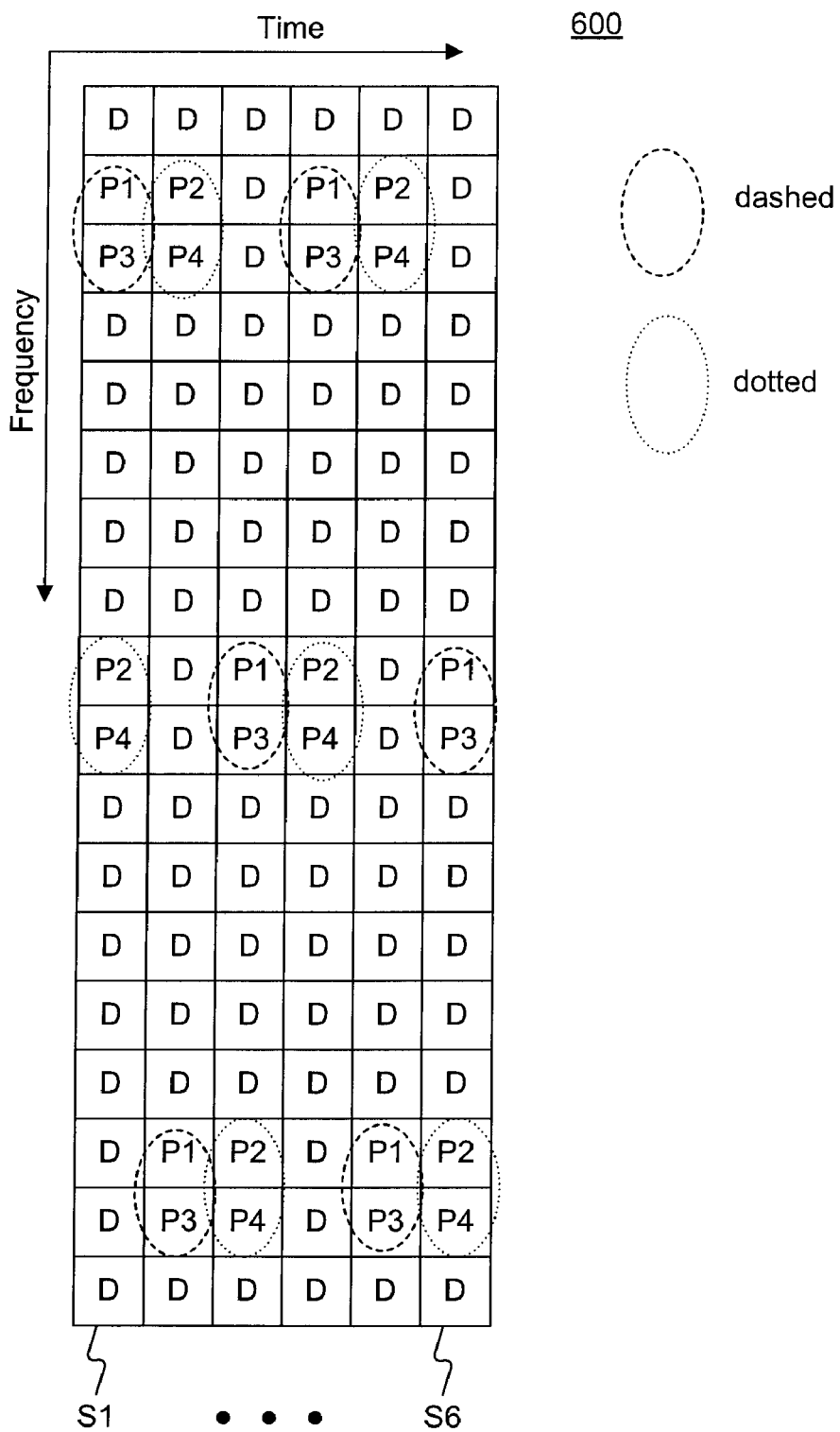
Figure 6C:
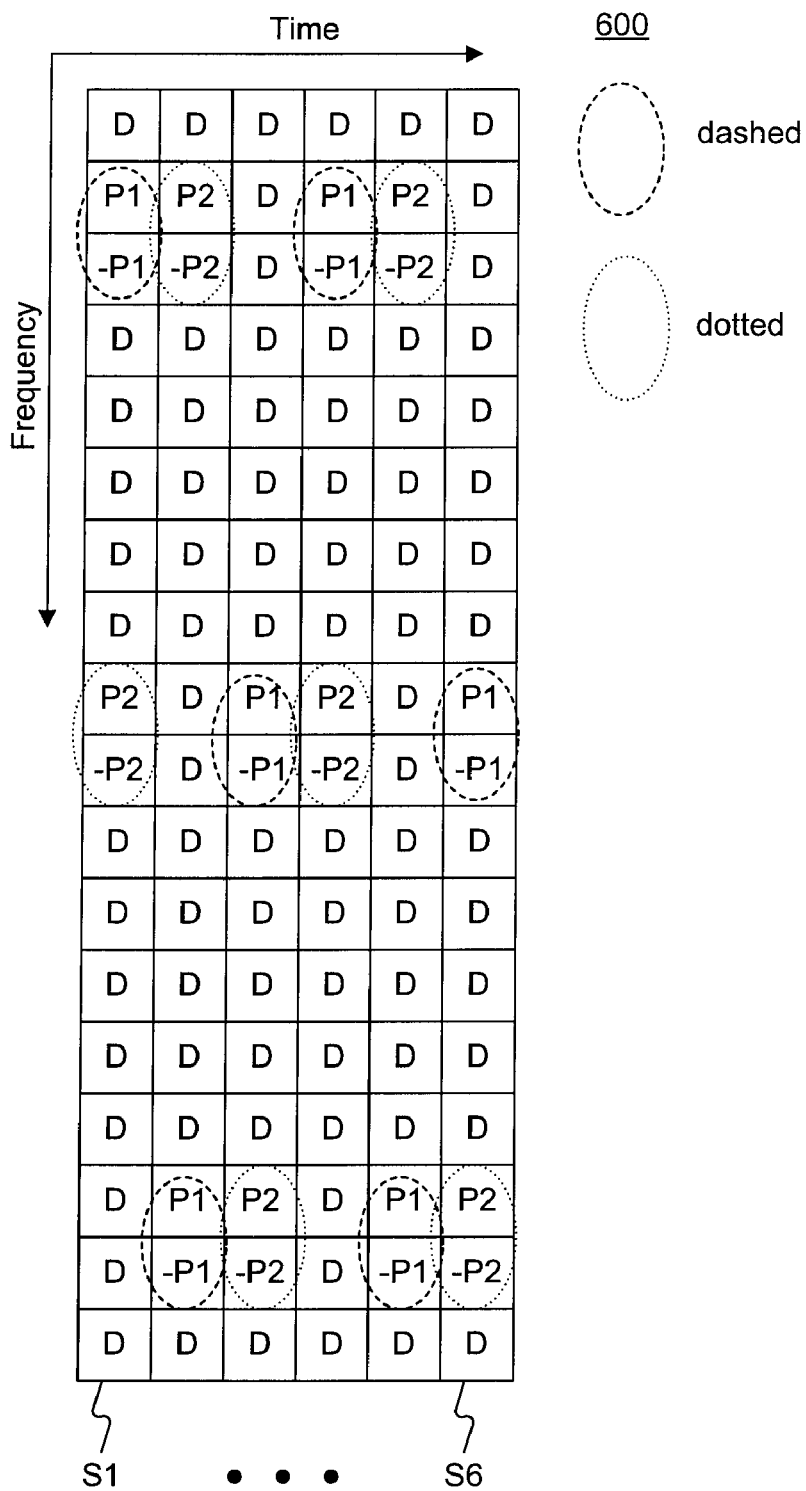

FIGS. 6A-6C illustrate a method for pilot design for data to be transmitted by a wireless communication system that may be in high mobility, according to an exemplary embodiment. For illustrative purposes only, it is assumed the communication system is an OFDM based communication system having first, second, third, and fourth antennas transmitting first, second, third, and fourth data streams, respectively.

FIG. 6A shows an original pilot pattern in a resource block 600 in a time-frequency domain. The original pilot pattern in the resource block 600 is the same as the original pilot pattern in the resource block 500 (FIG. 5A).

When the communication system is in low mobility, the communication system may transmit data using the first, second, third, and fourth transmitting antennas. A low-mobility pilot pattern may be generated based on the original pilot pattern in the resource block 600 (FIG. 6A). The generated low-mobility pilot pattern includes clustered or grouped pilot allocation.

In one exemplary embodiment, the pilot symbols for each of the first and second data streams in the original pilot pattern in the resource block 600 (FIG. 6A) are selected. Referring to FIG. 6B, for each of the selected pilot symbols for the first data stream, a subcarrier adjacent to the subcarrier carrying the one of the selected pilot symbols for the first data stream is used to carry a new pilot symbol for the third data stream, represented by each of the small blocks labeled as "P3." The one of the selected pilot symbols for the first data stream and the new pilot symbol for the third data stream are assigned to adjacent subcarriers in a same one of the OFDM symbols S1, . . . S6. As a result, the pilot symbols for the first data stream, represented by the small blocks labeled as "P1," and the pilot symbols for the third data stream, represented by the small blocks labeled as "P3," form a first plurality of groups of pilot symbols, as indicated by the dashed circles in FIG. 6B.

For each of the selected pilot symbols for the second data stream, a subcarrier adjacent to the subcarrier carrying the one of the selected pilot symbols for the second data stream is used to carry a new pilot symbol for the fourth data stream, represented by each of the small blocks labeled as "P4." The one of the selected pilot symbols for the second data stream and the new pilot symbol for the fourth data stream are assigned to adjacent subcarriers in a same one of the OFDM symbols S1, . . . S6. As a result, the pilot symbols for the second data stream, represented by the small blocks labeled as "P2," and the pilot symbols for the fourth data stream, represented by the small blocks labeled as "P4," form a second plurality of groups of pilot symbols, as indicated by the dotted circles. Thus, as shown in FIG. 6B, the low-mobility pilot pattern is generated for use when the communication system is in low-mobility.

When the communication system is in high mobility, the communication system may transmit a reduced or particular number of data streams. For example, the communication system may select only the first and second antennas to transmit the first and second data streams, respectively, and disable the third and fourth antennas. In addition, a high-mobility pilot pattern is generated based on the low-mobility pilot pattern shown in FIG. 6B. The communication system may, when in high-mobility, allocate pilot symbols for the first and second data streams, according to the high-mobility pilot pattern.

In one exemplary embodiment, each of the first and second plurality of groups of pilot symbols in the resource block 600 (FIG. 6B) is further updated to have anti-polarity, to generate the high-mobility pattern. For example, each of the first and second plurality of groups includes first and second pilot symbols at adjacent subcarriers in the OFDM symbols S1, . . . , S6. If the first pilot symbol is P1, the second pilot symbol is designated as −P1. If the first pilot symbol is P2, the second pilot symbol is designated as −P2. Thus, as shown in FIG. 6C, the high-mobility pilot pattern is generated for use when the communication system is in high-mobility. Modulation of pilot symbols having anti-polarity may reduce inter-carrier interference (ICI). Accordingly, accuracy of channel estimation based on interpolation techniques may be improved.

In exemplary embodiments consistent with the present invention, the frequency shift method described above may be further applied to the low-mobility pilot pattern or the high-mobility pilot pattern, if the pilot symbols for a data stream have relatively large distance disparities. As a result, the pilot symbols for that data stream may have reduced distance disparities.

In exemplary embodiments consistent with the present invention, locations of pilot symbols in the resource block 400, 500, or 600 may be varied, based on factors such as ICI and channel frequency selectivity. In one aspect, pilot symbols for low ICI may improve system performance when the communication system is in low mobility. In another aspect, pilot symbols having relatively small distance disparities may be beneficial for highly frequency-selective channels due to reduced interpolation error in channel estimation.

Figure 7:
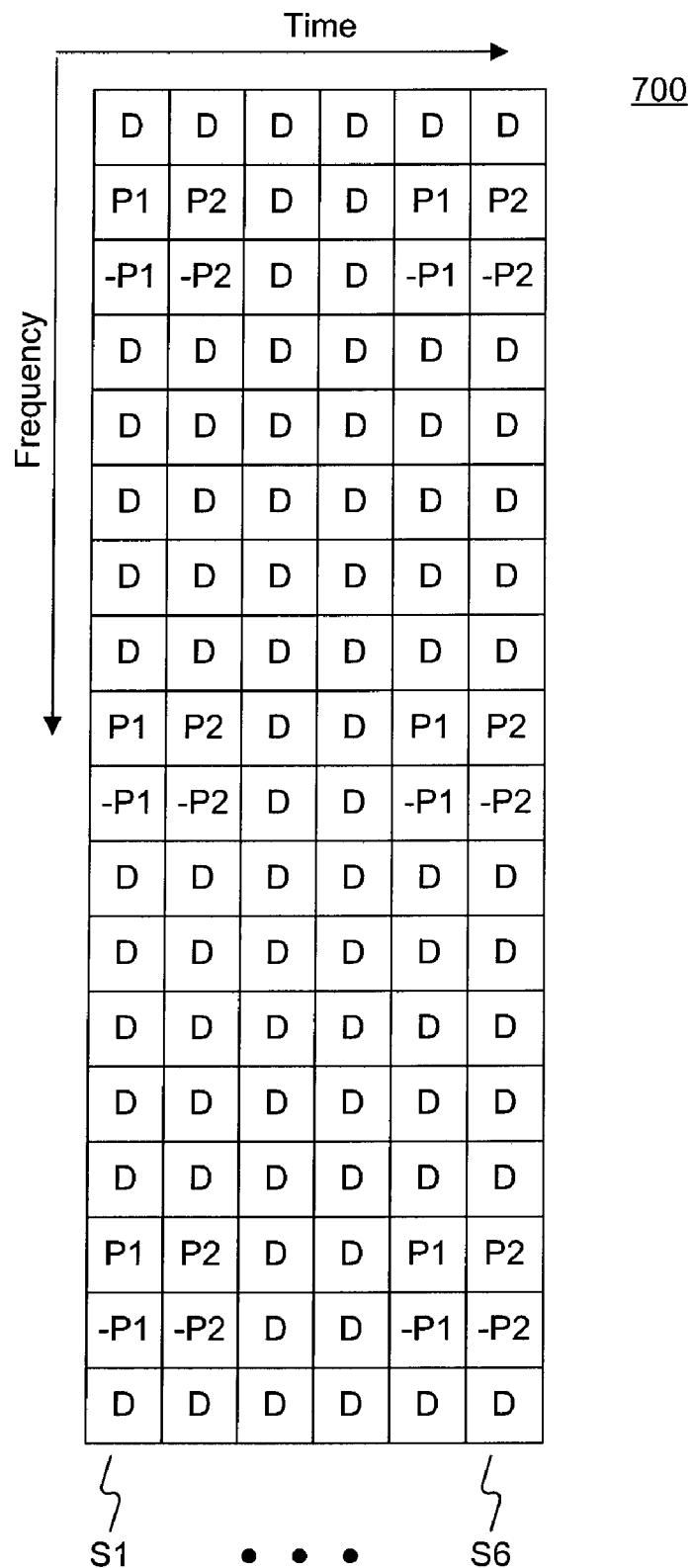
FIG. 7 shows a pilot design example in a resource block, according to an exemplary embodiment.

For example, referring back to FIG. 4B, ones of the pilot symbols are at boundary subcarriers in the resource block 400, corresponding to the first and last rows of the resource block 400. The pilot symbols at the boundary subcarriers may be symmetrically shifted to intermediate subcarriers in the resource block 400. FIG. 7 shows a pilot design example in a resource block 700 formed by varying the resource block 400 (FIG. 4B) by shifting pilot symbols at the boundary subcarriers to the intermediate subcarriers, according to an exemplary embodiment. For example, the pilot design in the resource block 700 may be used for highly frequency-selective channels.

Compared to the resource block 400 shown in FIG. 4B, a spacing between the pilot symbols for the first or second data stream has been reduced from seven times the subcarrier spacing (FIG. 4B) to six times the subcarrier spacing (FIG. 7). As a result, channel estimation at frequencies of intermediate subcarriers may be improved due to better data interpolation. In addition, because no pilot symbols are allocated to the boundary subcarriers in the resource block 700, extrapolation techniques may be used for channel estimation at frequencies on or close to the frequencies of the boundary subcarriers.

Figure 8A:
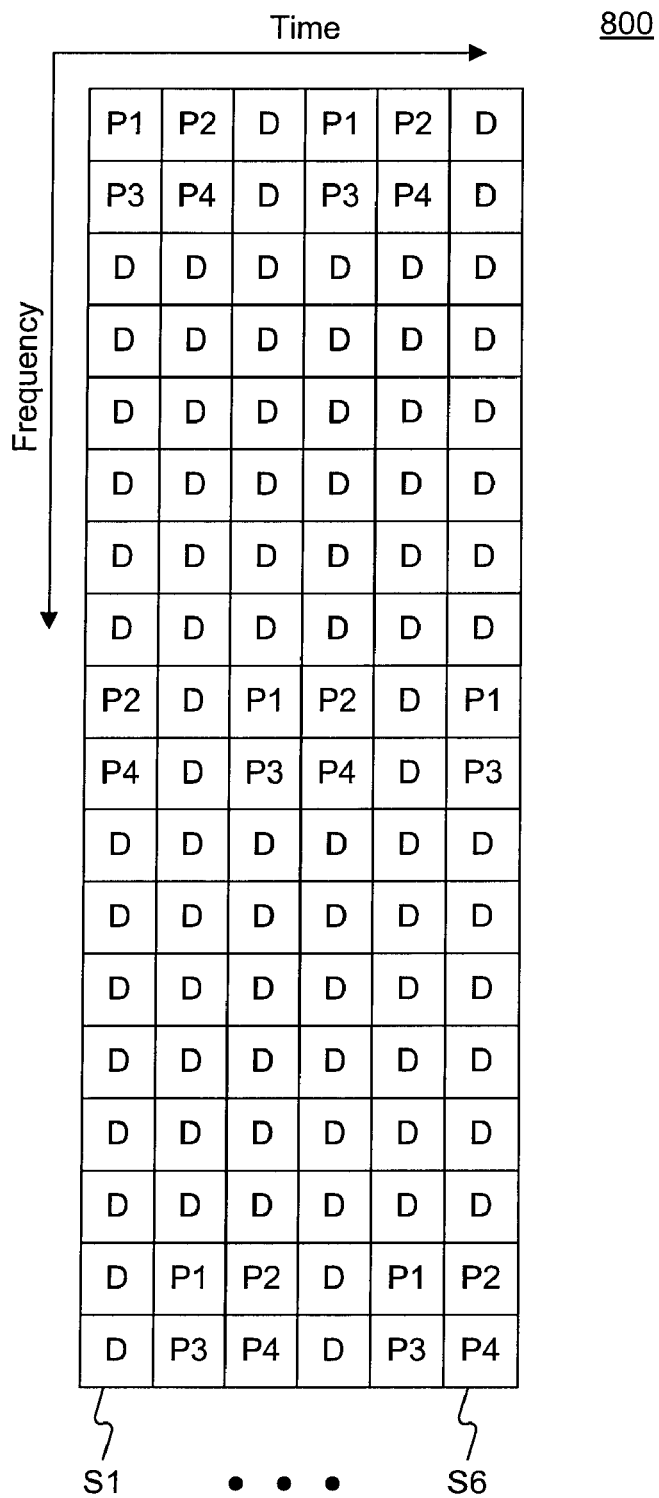
Figure 8B:
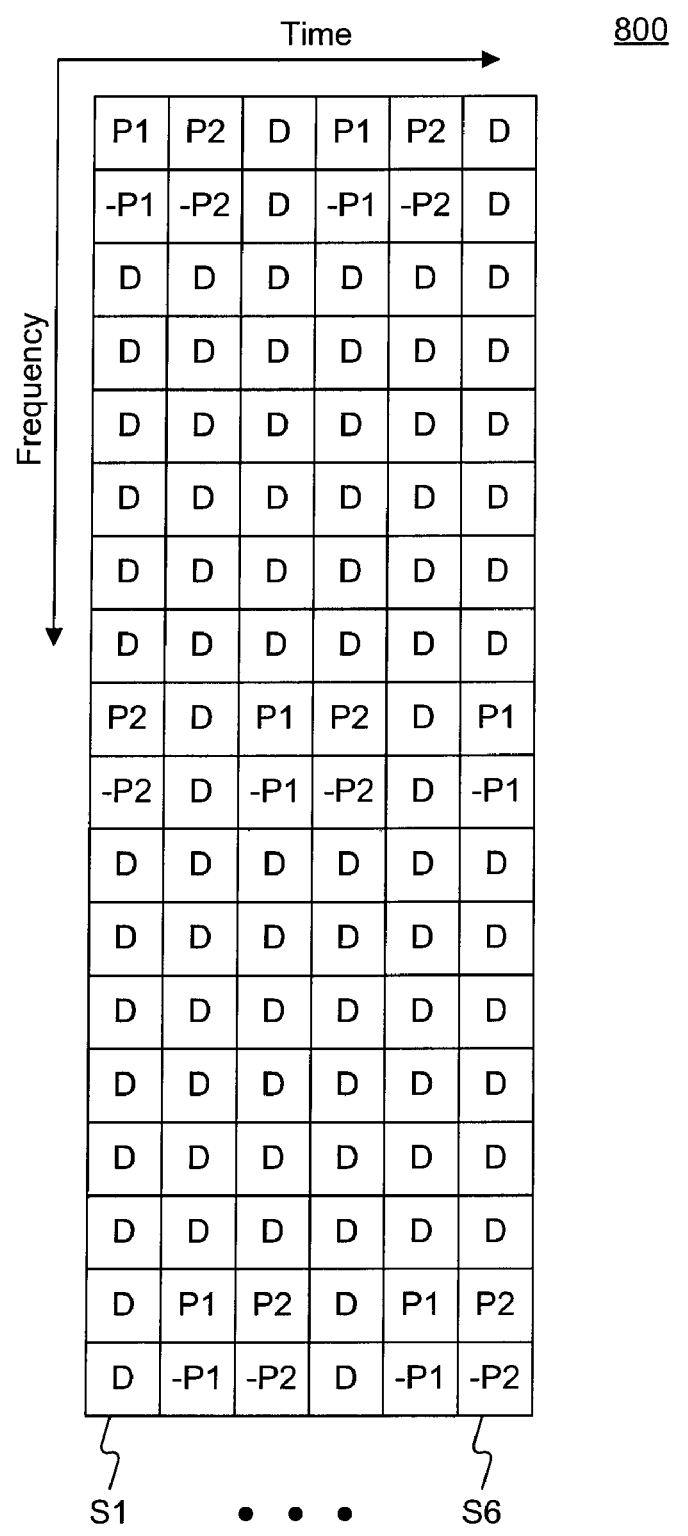

Conversely, pilot symbols at intermediate subcarriers in a resource block may be symmetrically shifted to boundary subcarriers. FIGS. 8A and 8B each show a pilot design example in a resource block 800 formed by varying the resource block 600 (FIGS. 6B and 6C) by shifting pilot symbols at the intermediate subcarriers to the boundary subcarriers, according to an exemplary embodiment. The resource block 600 in FIGS. 6B and 6C then becomes the resource block 800 shown in FIGS. 8A and 8B, respectively. As a result, channel estimation at frequencies on or close to the frequencies of boundary subcarriers may be improved due to better data interpolation and/or extrapolation.

In exemplary embodiments consistent with the present invention, pilot symbols at boundary times in a resource block, corresponding to the first and last columns of the resource block, may be shifted to intermediate times in the resource block. Conversely, pilot symbols at the intermediate times in the resource block may be shifted to the boundary times.

Figure 9:
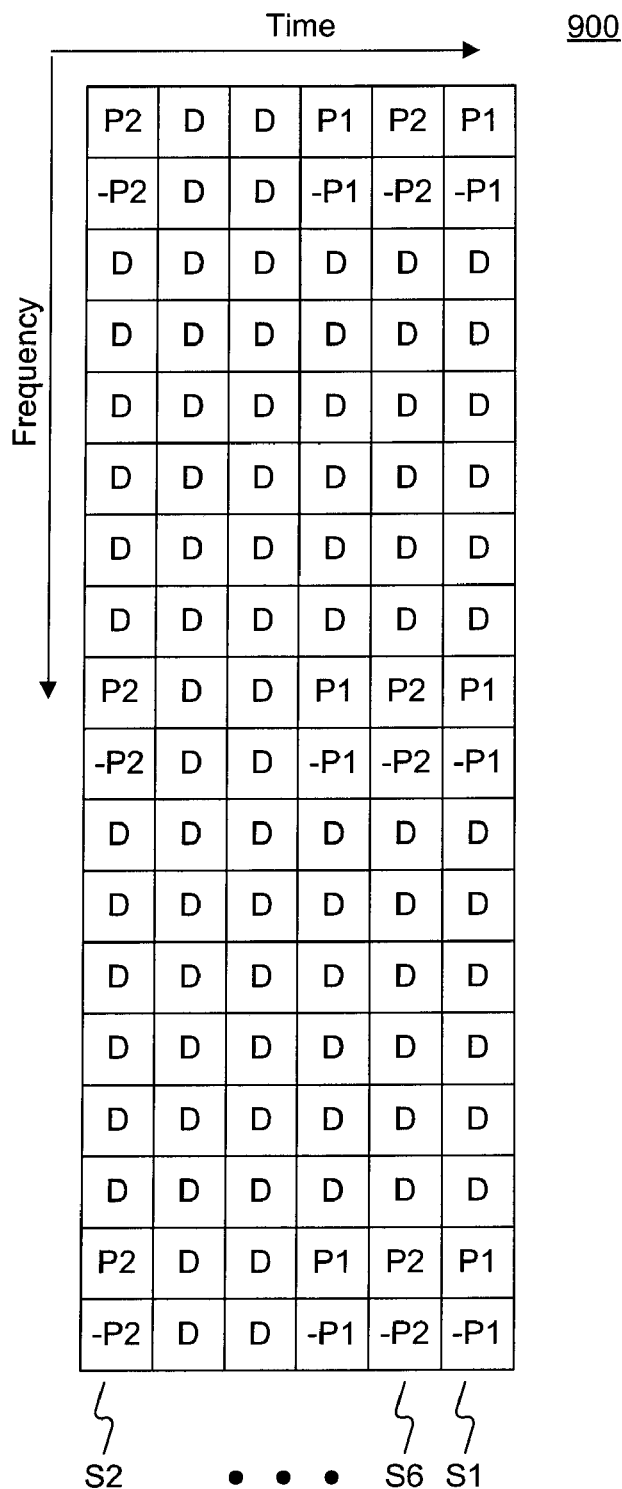
FIG. 9 shows a pilot design example in a resource block, according to an exemplary embodiment.

In exemplary embodiments consistent with the present invention, a resource block with high-mobility pilot allocation may be varied by cyclically shifting OFDM symbols in the resource block. FIG. 9 shows a pilot design example in a resource block 900 formed by varying the resource block 400 (FIG. 4B) by cyclically shifting the OFDM symbols S1, . . . , S6, according to an exemplary embodiment.

As noted above, pilot symbols for a data stream when the communication system is in high mobility may include a plurality of groups of pilot symbols, each including first and second pilot symbols with anti-polarity. In one exemplary embodiment, polarity of the first and second pilot symbols may be changed such that after being changed, the first and second pilot symbols retain the anti-polarity.

Figure 1:
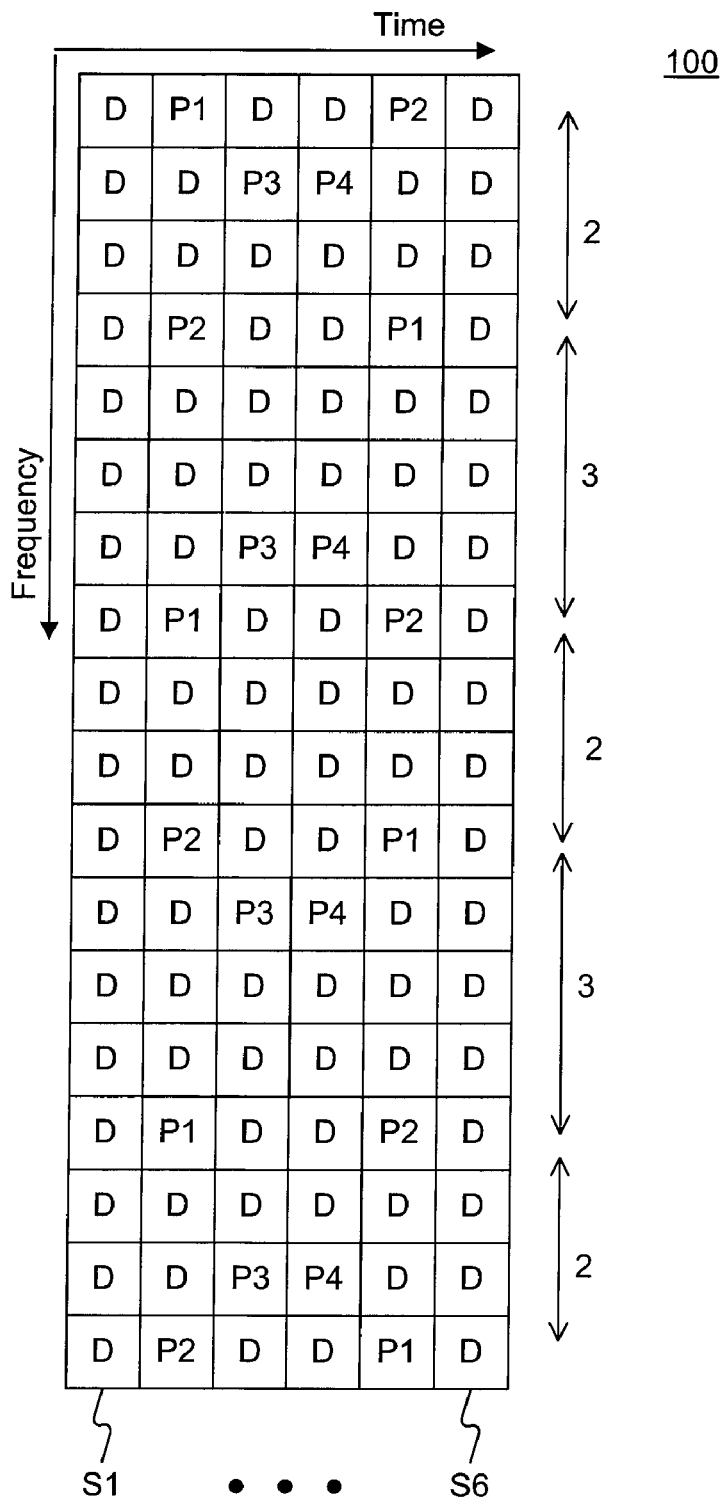
FIG. 1 illustrates a structure of a conventional resource block.
Figure 10A:
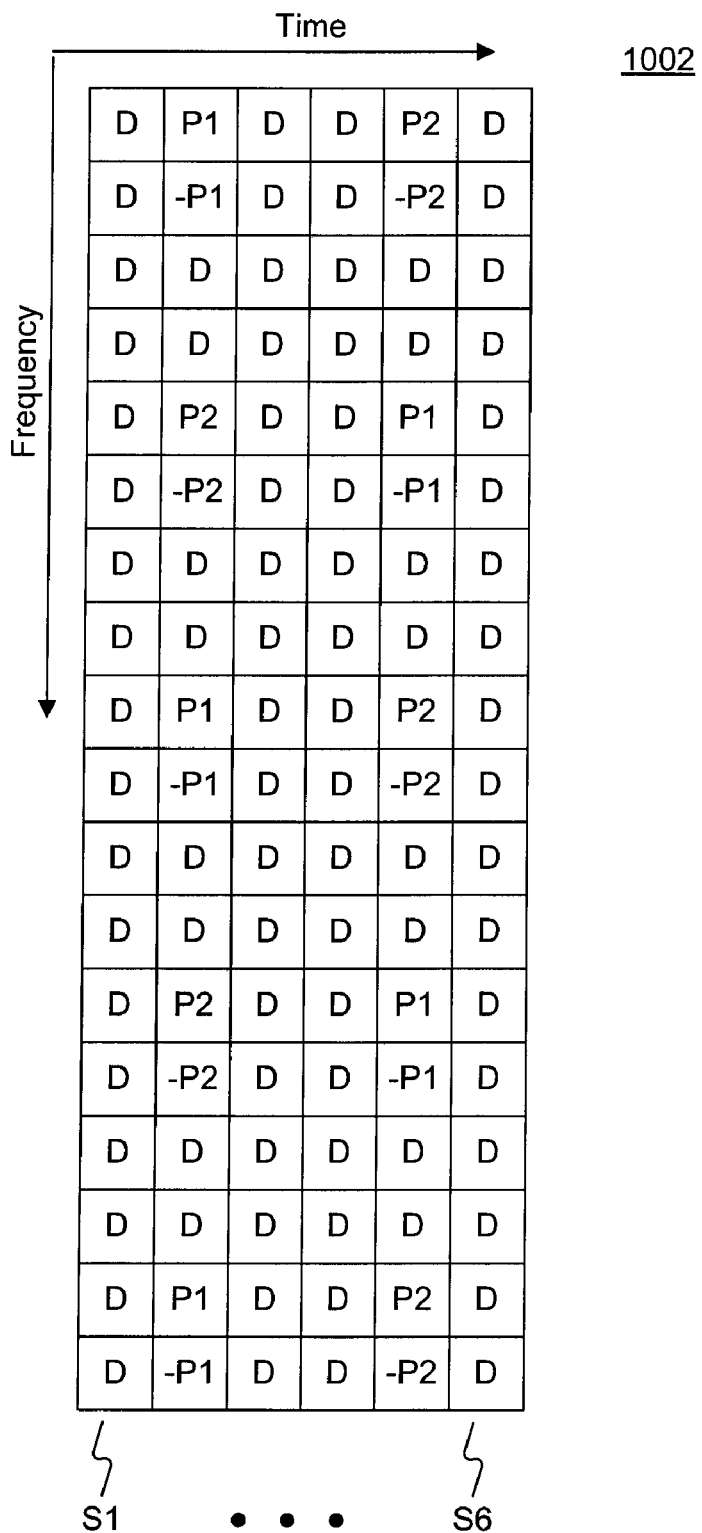
FIGS. 10A and 10B show additional pilot design examples in resource blocks with different sizes, according to exemplary embodiments.
Figure 10B:
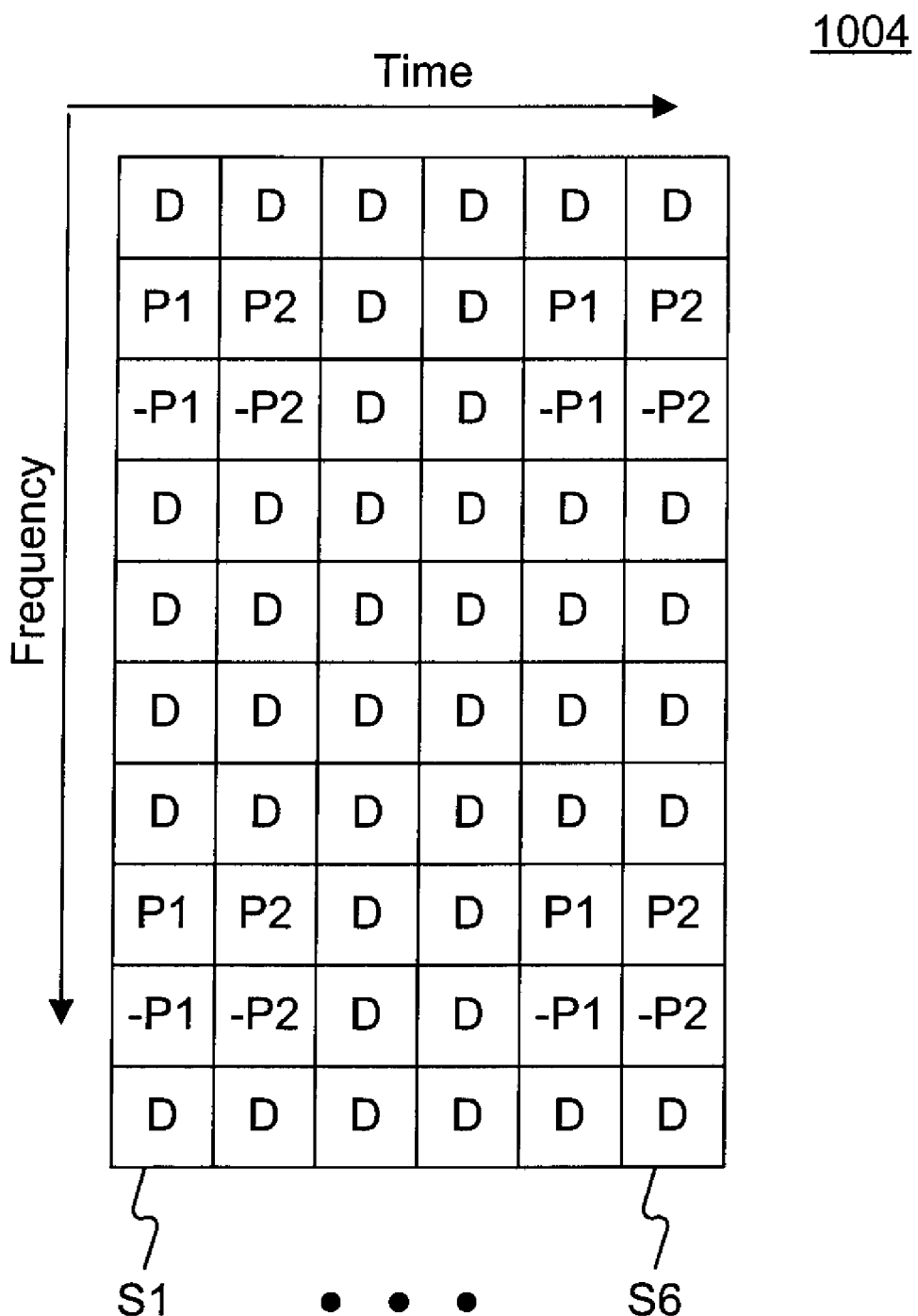

FIGS. 10A and 10B show additional pilot design examples in resource blocks 1002 and 1004 for a communication system in high-mobility, according to exemplary embodiments. Referring to FIG. 1A, the resource block 1002 includes six OFDM symbols and eighteen subcarriers. No pilot symbols are allocated at boundary times. Referring to FIG. 10B, the resource block 1004 includes six OFDM symbols and ten subcarriers. No pilot symbols are allocated to boundary subcarriers.

In exemplary embodiments consistent with the present invention, different factors may be considered to generate a low-mobility pilot pattern or a high-mobility pilot pattern. For example, pilot symbols with relatively small distance disparities may be preferred to improve channel interpolation performance. Also for example, extrapolation generally needs to be avoided or minimized. In other words, boundary frequencies and/or boundary times in a resource block are preferred to include pilot symbols. Further for example, a minimal number of extrapolated subcarriers in time and/or frequency may be replaced with a minimal pilot spacing.

Other embodiments of the invention will be apparent to those skilled in the art from consideration of the specification and practice of the invention disclosed here. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for pilot design for data to be transmitted by an orthogonal frequency-division multiplexing (OFDM) based communication system, the data being represented by a plurality of OFDM symbols, the method comprising:
    allocating, when the communication system is moving at a relatively high speed, a plurality of groups of pilot symbols for at least one data stream based on a pilot symbol allocation for use when the communication system is moving at a relatively low speed, such that the communication system transmits a reduced number of data streams when moving at the relatively high speed, wherein the allocating further comprises:
        including the pilot symbols in each of the groups in a same one of the OFDM symbols; and
        assigning the pilot symbols in each of the groups to adjacent subcarriers of the communication system.

2. The method of claim 1, further comprising including first and second pilot symbols with anti-polarity in each of the groups.

3. The method of claim 2, further comprising changing polarities of the first and second pilot symbols such that, after the changing, the first and second pilot symbols retain the anti-polarity.

4. The method of claim 1, wherein the plurality of OFDM symbols are a first plurality of OFDM symbols, the pilot symbol allocation when the communication system is moving at the relatively low speed comprising:
    allocating a first pilot symbol for a first data stream and a second pilot symbol for a second data stream to adjacent subcarriers of the communication system, the first and second pilot symbols being in one of a second plurality of OFDM symbols.

5. The method of claim 4, wherein the allocating when the communication system is moving at the relatively high speed comprises:
    grouping the first and second pilot symbols together; and
    allocating one of the plurality of groups of pilot symbols for the at least one data stream based on the grouping.

6. The method of claim 1, further comprising allocating the groups of pilot symbols to reduce frequency distance disparities among the pilot symbols.

7. The method of claim 1, wherein the data is represented by the plurality of OFDM symbols in a resource block, the method further comprising:
    symmetrically shifting first and second ones of the plurality of groups of pilot symbols from boundary subcarriers to intermediate subcarriers in the resource block.

8. The method of claim 1, wherein the data is represented by the plurality of OFDM symbols in a resource block, the method further comprising:
    symmetrically shifting first and second ones of the plurality of groups of pilot symbols from intermediate subcarriers to boundary subcarriers in the resource block.

9. The method of claim 1, wherein the data is represented by the plurality of OFDM symbols in a resource block, the method further comprising:
    symmetrically shifting first and second ones of the plurality of groups of pilot symbols from boundary times to intermediate times in the resource block.

10. The method of claim 1, wherein the data is represented by the plurality of OFDM symbols in a resource block, the method further comprising:
    symmetrically shifting first and second ones of the plurality of groups of pilot symbols from intermediate times to boundary times in the resource block.

11. The method of claim 1, wherein the data is represented by the plurality of OFDM symbols in a resource block, the method further comprising:
    cyclically shifting the plurality of OFDM symbols in the resource block.

12. An apparatus for pilot design for data to be transmitted by an orthogonal frequency-division multiplexing (OFDM) based communication system, the data being represented by a plurality of OFDM symbols, the apparatus being configured to:

allocate, when the communication system is moving at a relatively high speed, a plurality of groups of pilot symbols for at least one data stream based on a pilot symbol allocation for use when the communication system is moving at a relatively low speed, such that the communication system transmits a reduced number of data streams when moving at the relatively high speed;

include the pilot symbols in each of the groups in a same one of the OFDM symbols; and assign the pilot symbols in each of the groups to adjacent subcarriers of the communication system.

\* \* \* \* \*